United States Patent [19]

Aoyama et al.

[11] Patent Number: 4,943,912

[45] Date of Patent: Jul. 24, 1990

[54] PARALLEL PROCESSOR SYSTEM HAVING CONTROL PROCESSOR AND ARRAY CONTROL APPARATUS FOR SELECTIVELY ACTIVATING DIFFERENT PROCESSORS

[75] Inventors: Tomoo Aoyama; Hiroshi Murayama, both of Hadano, Japan

[73] Assignees: Hitachi, Ltd., Tokyo; Hitachi Computer Engineering Co., Ltd., Kanagawa, both of Japan

[21] Appl. No.: 106,864

[22] Filed: Oct. 13, 1987

[51] Int. Cl.⁵ .......................... G06F 15/16; G06F 9/00
[52] U.S. Cl. ..................................... 364/200; 364/228; 364/228.7; 364/230.3; 364/230.4; 364/736
[58] Field of Search ... 364/200 MS File, 900 MS File, 364/736

[56] References Cited

U.S. PATENT DOCUMENTS

| | | | |
|---|---|---|---|
| 3,614,745 | 10/1971 | Podvin et al. | 364/200 |
| 4,219,873 | 8/1980 | Kober et al. | 364/200 |
| 4,412,303 | 10/1983 | Barnes et al. | 364/200 |
| 4,636,948 | 1/1987 | Gdaiec et al. | 364/300 |
| 4,736,291 | 4/1988 | Jennings et al. | 364/200 |
| 4,773,038 | 9/1988 | Hillis et al. | 364/900 |
| 4,780,821 | 10/1988 | Crossley | 364/200 |
| 4,783,738 | 11/1988 | Li et al. | 364/200 |

OTHER PUBLICATIONS

John Beetem et al., "The GF11 Supercomputer", Proc. of IEEE ICPP, '85, 1985.

Primary Examiner—Thomas C. Lee
Attorney, Agent, or Firm—Antonelli, Terry & Wands

[57] ABSTRACT

A parallel processor system comprises a main storage, a processor array control apparatus, a control processor which requests the processor array control apparatus to execute the processing in accordance with a procedure start instruction, and a plurality of processor elements each containing a local memory. In response to a designation from the control processor, the processor array control apparatus transfers the program from the main storage to the local memories in all of the processor elements before they are driven. The processor array control apparatus then controls the conditions of the processor elements and drives those processor elements which are capable of processing the procedure in accordance with the procedure start instruction from the control processor.

2 Claims, 7 Drawing Sheets

SOURCE PROGRAM

```
C    LOAD    (SUB)        ①
C    PARALLEL  DO         ②
        DO 100 I=1,N      ③
          CALL SUB(X(I))  ④
100     CONTINUE          ⑤
          ⋮
          ⋮
C    LOCAL MEMORY         ⑥
        SUBROUTINE SUB(X) ⑦
          ⋮
          ⋮
        RETURN            ⑧
        END               ⑨
```

OBJECT CODE

```
        GR0 ← Address(SUB)      ①
        GR1 ← program length    ②
        Broadcasting GR0,GR1    ③ label:  argument list generation ④

GR0 ← Address(list)     ⑤
        GR1 ← list length       ⑥
        GR2 ← type              ⑦
        CALL   GR0,GR1,GR2      ⑧
        I ← I+1                 ⑨
        BXLE    label           ⑩

CHK:    Test Ap                 ⑪
        BC  CHK                 ⑫
          ⋮
          ⋮
```

PARALLEL PROCESSOR SYSTEM HAVING CONTROL PROCESSOR AND ARRAY CONTROL APPARATUS FOR SELECTIVELY ACTIVATING DIFFERENT PROCESSORS

BACKGROUND OF THE INVENTION

The present invention relates to a parallel processor system, and more specifically to a parallel processor system which processes the data by driving a plurality of subsidiary processors using a control processor.

Parallel processors have now been widely studied in order to execute scientific and technological calculations at high speeds. Among them, PAX developed by researchers at Tsukuba University is reaching the practicable level (PAX Computer, compiled by Hoshino, published by Ohm Co., 1985). According to the PAX, the processor elements are coupled in the form of an array, and the input and output data of a program stored in the processor elements are limited to those of the neighboring processor elements only, in order to carry out the parallel processing. Even when the communications are limited among the processor elements as mentioned above, the range of application can be expanded if the algorithm is so modified as to be adapted to the problem that is to be solved, and there can be realized a parallel processor that meets practical use.

However, there has been urged to carry out the communications among the processor elements maintaining a larger degree of freedom than that of the array-like coupling. For this purpose, there has been developed a computer that carries out the parallel processing by dividing the program processing into process units called tasks, and allocating a plurality of tasks to a plurality of computer resources. In a system which drives a plurality of tasks to carry out the parallel processing by the multi-tasking process, and increased degree of freedom is provided since the communications are effected among the processes of tasks via a main storage or a register accompanied, however, by an extended overhead time for starting the tasks.

In addition to the multi-tasking method, there has been known a method which is equipped with a network among the processors in order to further increase the degree of freedom of communications among the processor elements than that of the array-like coupling. According, for example, to J. Beetem, M. Denneau, D. Weingarten, "The GF11 Supercomputer" Proc. of IEEE ICPP, '85, 1985, the communication is carried out among any processor elements using a switching network of two stages. The method which passes through the network of n stages is excellent as a method of transmitting the data. When it is attempted to couple very many processor elements through a short path, however, the amount of hardware so increases that the performance/cost ratio becomes no more realistic.

According to the above-mentioned variety of parallel processor systems, a high processing performance can be obtained based upon the parallel processing when the programs are prepared using a language (such as machine language) that is adapted to the hardware of parallel processor. However, if it is attempted to have the conventional software assets by the above-mentioned parallel processor system, language specifications of the conventional programming language are not adapted to the archtecture of the parallel processor system, and the program is not executed or performance deteriorates considerably. This is because the conventional programming language is constituted by utilizing the serial nature of the processing. In the parallel processor PAX, for example, the program is described by giving attention to the near mutual action among the processor elements. This method is desirable when a physical phenomenon is modified into the near mutual action and is efficiently processed, but cannot at present be adapted to general physical phenomena without difficulty. Moreover, this method inhibits the use of a variety of software assets that are accumulated thus far. Succession of the software assets is not regarded to be important in the field of non-numerical calculation. There, however, remains a portion where a computation algorithm is described in detail and precisely and where error theory is logically constituted, such as convergence of non-linear calculation, maintenance of calculation precision precision relying upon the sequence of calculation, and the like in the field of numerical calculation. From the standpoint of the computer archtecture, therefore, it is difficult to abandon the past software assets, and it is desired to construct the computer archtecture in such a manner that the past accumulation is effectively utilized.

The following conditions are required for a parallel processor to succeed the past software assets:

1. The number of processor elements is not specified from the program language.
2. Logically, the storage of a single hierarchy.
3. Keep communication means among the processor elements such as switching networks off the sight as viewed from the program language.

This is equal to the case where the penetration of a process resource of a parallel processor is set very poorly by the program language, and a parallel processing function of the parallel processor is used without almost touching the past assets of the serial processing algorithm.

SUMMARY OF THE INVENTION

The object of the present invention is to provide a parallel processor system which makes it possible to carry out the parallel processing almost without touching the software.

The present invention comprises a main storage, a processor array control means, a control processor which reads an instruction from the main storage and which requests the processor array control means to execute the processing according to a procedure start instruction, and a plurality of processor elements each being equipped with a local memory. The processor array control means includes a condition control means which controls the conditions of each of the processor elements, and drives the processor elements that are capable of processing the procedure in accordance the procedure start instruction from the control processor. The processor array control means further has means which stores a program from the main storage onto the local memories of all processor elements in response to an instruction from the control processor before the processor elements are driven.

In response to the instruction from the control processor, the processor array control means stores the program in the local memories of all processor elements, so that a user program can be processed by any processor element. Further, the processor array control means controls the conditions of the individual processor elements, and allocates the processor elements that are under the processable condition.

DESCRIPTION OF THE PREFERRED EMBODIMENTS

Figure 1:
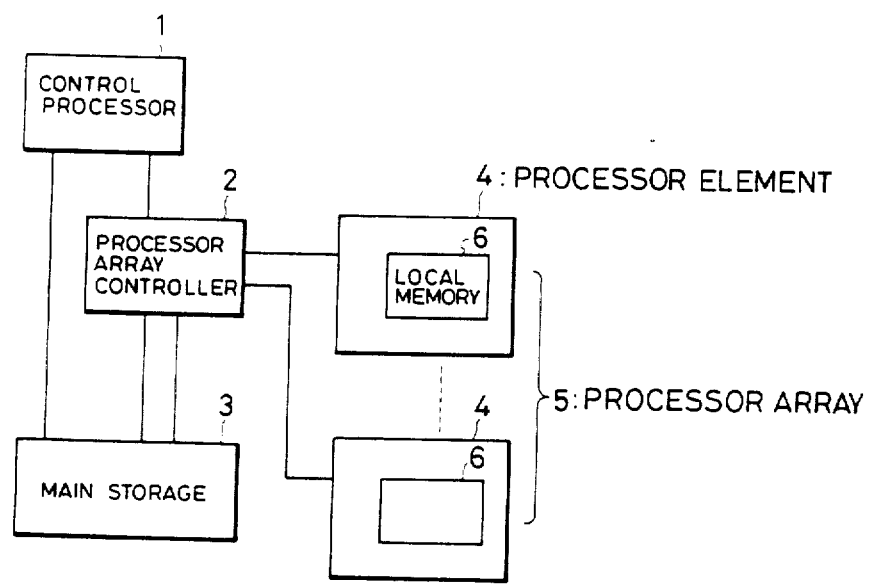
FIG. 1 is a block diagram for explaining a parallel processor system according to the present invention.

First, outline of the invention will be described prior to illustrating a concrete embodiment.

The aforementioned conditions are as very difficult to establish as to satisfy the conflicting conditions simultaneously. However, parallel nature is concealed even in the conventional serial processing program language. By utilizing this nature, therefore, the aforementioned object can be achieved though limitation is imposed on the parallel nature. The following description deals with the probability of parallel description that exists in the conventional program language, with reference to FORTRAN language that is most widely used in the scientific and technological calculations.

In the FORTRAN language, what is particularly peculiar is a DO statement. Other execution statements can be corresponded to data processing operations of the processor. Though the DO statement has a meaning "to repeat the processing", it does not perform the data processing operation such as deforming the data. The DO statement corresponds to a branch instruction of the machine instruction, which, however, does not carry out the data processing.

In the FORTRAN language, a CALL statement, too, occupies a peculiar position. The CALL statement calls other procedure, transfers the control to the procedure, and whereby the execution of the CALL statement is not completed until the processing of the procedure is completed. Therefore, when a plurality of procedures are described by a plurality of CALL statements in a DO block that is blocked by the DO statement and a CONTINUE statement, these procedures are serially executed. This is attributed to the nature of the CALL statement. In a processor which performs the process serially, it is not allowed to add the nature, except the above-mentioned nature, to the CALL statement. In a parallel processing system in which a plurality of control mechanisms exist, however, the processing of a CALL statement can be divided into two streams at a moment when the procedure is started, i.e., divided into a stream which controls the continuation of processing in the procedure and a stream which controls the completion of the CALL statement as viewed from the side where the procedure is read out. If the above-mentioned nature is imparted to the CALL statement, the following DO loop,

```
DO 100 I = 1, N
CALL SUB (X (I))
100 CONTINUE
``` describes the processing which continuously initiates the procedures SUB of a number of N.

In order to make distinction over the conventional DO block processing, the following COMMENT statement is added in advance of the DO statement, i.e.,

```
C    PARALLEL DO
     DO 100 I = 1, N
     CALL SUB (X (I))
100  CONTINUE
```

In an ordinary case, the COMMENT statement does not at all affect the processing. The processing, however, can be carried out in parallel by a parallel processor system if a compiler is provided with a function to analyze the character train in the COMMENT statement and if the processing of CALL statement in the DO block is modified into an instruction train of the type that will be completed when the procedure is started. The processing can be serially executed by a general computer for serial processing if use is made of a compiler that does not have a function for analyzing the COMMENT statement.

In the parallel procesor system, the processor elements that process the arithmetic operation are in many cases provided with local memories. This is to heighten the speed of calculation carried out in the processor elements. In the parallel processor system into which local memories are introduced, on the other hand, there exist memories of two hierarchies that are logically different from each other, i.e., there exist a main storage and local memories.

When a program is to be newly prepared for the parallel processor system, there may exist memories of two hierarchies that are logically different as mentioned above. When the conventional software assets are to be processed by the parallel processor system at high speeds, however, it is not possible to properly operate the program using memories of logically different two hierarchies. Therefore, even when there exist a plurality of memory hierarchies, it is necessary that they appear as a single hierarchy from the standpoint of program language specifications such that the conventional software assets can be effectively used.

In the procedure called by the CALL statement, the data used in the procedure can be described in the form of procedure argument. By utilizing this nature, the data described as an argument is allocated onto the main storage, and the data used only in the procedure that is called is allocated onto the local memories. The data of these two modes can be allocated using a compiler of the parallel processing system. Therefore, a plurality of procedures must be divided into those that are to be processed by the processor elements of the parallel processor system and those that are to be serially processed. By using a COMMENT statement, this distinction can be written as follows:

```
C LOCAL MEMORY
    SUBROUTINE xxxx (X, Y, Z)
  PROCESSING
  RETURN
  END
```

The compiler of the parallel processor system should detect a character train, i.e., LOCAL MEMORY in the COMMENT statement, should recognize variables X, Y, Z used in the process as data on the main storage, and should allocate variables of other designations onto the local memories. On the other hand, the compiler used in the processor of a serail processing does not analyze the character train of the COMMENT statement and allocates all variables in the procedure onto the main storage. Like the method of allocating variables, the access to the variables can be expressed by two kinds of access instructions for the main storage and the local memories. The two kinds of accesses can be distinguished by a compiler. In the parallel processor and serial processor, therefore, no serious trouble develops in executing a conventional program.

Among the arguments of a plurality of procedures called in the DO block, there may exist those whose variables have the same designation.

In the following examples, i.e.,

```
DO 100 I = 1, N
CALL SUB 1 (X (I), Y (I))
CALL SUB 2 (A (I), B (I))
CALL SUB 3 (X (I), Z (I))
100 CONTINUE
``` a variable X is commonly used in the procedures SUB 1 and SUB 3. Therefore, the procedures SUB 1 and SUB 3 cannot be executed in parallel. However, there exists no dependence of data between SUB 1 and SUB 2; therefore, the procedures SUB 1 and SUB 2 can be started in parallel. It is further possible to start SUB 3 and SUB 1 in parallel that have different control variables I of DO.

When there exists a common variable among the arguments of procedures, the probability decreases for processing the procedures in parallel. Communication, however, is maintained via the main storage between a processor element that is processing the procedure SUB 1 and another processor element that is processing the procedure SUB 3. Communication can be maintained among the processor elements by utilizing the above-mentioned nature in the case when the arguments of procedures are overlapped. In this case, furthermore, no new statement is introduced into the language specifications, and no problem arises with regard to interchanging the program with the conventional one.

Described below is how to handle the parallel processor system in the procedure portions that are to be processed in parallel. In a general-purpose processor, the program exists on the main storage. When the data are being processed, the program is read out from the main storage together with the data that are necessary for calculation. If this system is adapted to the parallel processor, a request for reading the program is issued to the main storage from each of the processor elements. The request for reading increases in proportion to the increase in the number of processors. Therefore, if the main storage does not have a data transfer ability that meets the number of the processors, a memory throughput neck generates conspicuously when the parallel calculation is being carried out. This adversely affects the performance of the parallel processor system. In order to eliminate the program read-out neck in the parallel processor system, it is desired that the procedures to be started in parallel are all stored in the local memories in the processor elements in front of the DO block that effects the parallel start processing. In this system, the local memories must have a considerably large capacity. The current mounting technology, however, does not permit each processor element to be equipped with a necessary and sufficient local memory. Therefore, a program over-lay technology is employed. That is, a group of procedures called in the parallel processing execution DO are stored in the local memories prior to starting DO. This necessitates a statement for loading the group of programs. This statement must be invalid in the general-purpose processor and must, hence, be prepared in the form of a COMMENT statement.

In the foregoing was discussed the problems in connection with the program language. The hardware of the parallel processor system will now be studied. What is necessary in the parallel processor system is how to start the parallel processing at high speeds. Even in a serial processor that is now widely used, the pseudo-multi-tasking is carried out based upon time slicing and the parallel processing is carried out. In a dyadic processor, for example, the OS allocates different tasks to the two CPU's, so that the processing performance is improved. This method which uses a superviser of OS, however, requires an extended overhead time for starting the task. Due to the overhead time, therefore, it becomes difficult to start many tasks.

In order to start many tasks at high speeds, a portion for calling the procedure of task start processing must be realized with a hardware.

FIG. 1 is a block diagram which schematically illustrates a parallel processor system according to the present invention, wherein a logic circuit in a processor array controller 2 and a logic circuit or a microprogram of a control processor 1, carry out the processing for calling procedure. That is, the control processor 1 reads the program that exists on the main storage 3 and requests the processor array controller 2 to process a procedure start instruction when it is detected. The processor array controller 2 examines the memory portions that are controlling the conditions of the processor array 5 in the circuit, and determines whether the procedure start instruction can be executed or not. When the procedure start instruction can be executed, the processor elements 4 are started. When the procedure start instruction cannot be executed, the data is sent to the control processor 1 which executes again the procedure start instruction in the next cycle.

A plurality of procedures can be started at high speeds by the aforementioned system.

Reverting to the program level, considered below are the start of a task and the control of program execution.

| C | PARALLEL DO | ... | (1) |
|---|---|---|---|
|   | DO 100 I = 1, N | ... | (2) |
|   | CALL SUB (X (I)) | ... | (3) |
|   | 100 CONTINUE | ... | (4) |

After the procedure SUB is allocated to the processor element 4 by the execution of the statement (3) in the above DO block, the process described in the procedure SUB is executed by the processor elements 4. On the other hand, the processor array controller 2 initiates the procedure SUB and transfers the control toward the side of the DO block where the SUB is called. Therefore, the CONTINUE statement (4) is processed while the procedure SUB of the statement (3) is being processed by the processor elements 4. In the CONTINUE statement, the statement (3) is executed when the control variable "I" of DO is smaller than N. The procedure SUB is executed when there exist in the parallel processor the processor elements 4 that are not yet used. In this case, the procedures SUB ($\times$(I)) and SUB ($\times$(I+1)) are executed in parallel. When the processor elements 4 are all used, the processor array controller 2 sends a procedure start impossible signal to the control processor 1 which then executes the statement (3) in the next machine cycle. When the processor element 4 is busy, therefore, the process is substantially interrupted on the side of the control processor 1, and the procedure does not run out of control. When the processing of procedure by the processor elements 4 is completed, the completion data is sent to the processor array controller 2 to reset busy data on the memories that store conditions corresponding to the processor elements in the circuit. This causes the procedure start processing to be effected again.

Thus, the procedures are processed in parallel.

When the value of DO control variable "I" becomes equal to N in the processing of the statement (4), the control processor 1 examines the busy data of processor elements 4 in the processor array controller 2, and waits until the data are all reset. This is to confine the parallel processing in the DO block. In processing the programs in parallel by the parallel processor system, therefore, the user needs to pay attention to the DO block only, whereby the programs can be easily maintained and errors can be easily found.

Another idea is to execute the next statement without examining the conditions of the processor elements in the last CONTINUE statement of the DO block. This makes it difficult to logically decode the program but makes it possible to increase the processing speed. The selection between the two can be effected using the COMMENT statement of the DO block.

In the above-mentioned system for starting a plurality of procedures at high speeds, it is difficult to realize a multiple nest of parallel start DO loops. This is because the execution of the task is allocated to the existing processor elements.

An embodiment of the present invention will now be described in detail in conjunction with the drawings. In FIG. 1, reference numeral 1 denotes a control processor, 2 denotes a processor array controller, 3 denotes a main storage, 4 denotes processor elements, and 6 denotes local memories. The processor elements exist in a plurality of numbers. The program, first, exist on the main storage. The control processor performs the processing using a program and data on the main storage relying upon the same instruction control as that of the general-purpose serial processing system.

Figures 2A, 2B, 4:
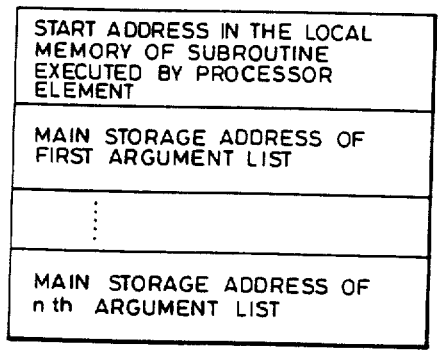
FIGS. 2(a) and 2(b) are diagrams showing a list of source codes and object codes for parallel processing.
FIG. 4 is a diagram showing argument lists used at the time of starting the parallel processing.

FIG. 2(a) shows a source program which is compiled by a control processor 1 and whose objects codes are formed on the main storage as shown in FIG. 2(b). In the source program of FIG. 2(a), a statement (6) designates to convert the object codes of subsequent subroutines into codes that are adapted to be executed by the processor elements. It is now presumed that the object codes are formed that are adapted to the instruction system of such processor elements. It is then presumed that a start address of a group of codes and a program length are found. This is equivalent to that the cross compiling of the processor elements is performed by the control processor 1. The technology of cross compiling has been established already.

The statement (1) of the source program of FIG. 2(a) stands for a process for transferring the object codes to all of the processor elements. This statement corresponds to the statements (1) to (3) in the object codes. In the object code (1), the start address of an object code of a subroutine is stored in a register GRO of the control processor. In the object code (2), the program length of the subroutine is stored in the register GR1. In the object code (3), the subroutine is stored in the local memories of all processor elements using the data stored in the above-mentioned two registers.

The user space on the local memory is different from the space on the main storage with regard to many points. Since the processor array controller 2 automatically allocates the processing of procedure to the empty processor elements 4, the local memories 6 of the processor elements 4 appear to be equivalent as viewed from the user program. Therefore, the local memories 6 of the processor elements 4 constitute the same address space. The same address space holds true for the operation that is effected by the control processor 1 for the local memories 6, but does not hold true for the operation in the processor elements 4. The concept of "user space" does not exist independently but exist for the operation of an instruction. To carry out the user program by given processor elements 4, therefore, the program must be transferred to all of the processor elements 4. The instruction which effects the transfer will be referred to as broadcasting hereinbelow.

Figure 3:
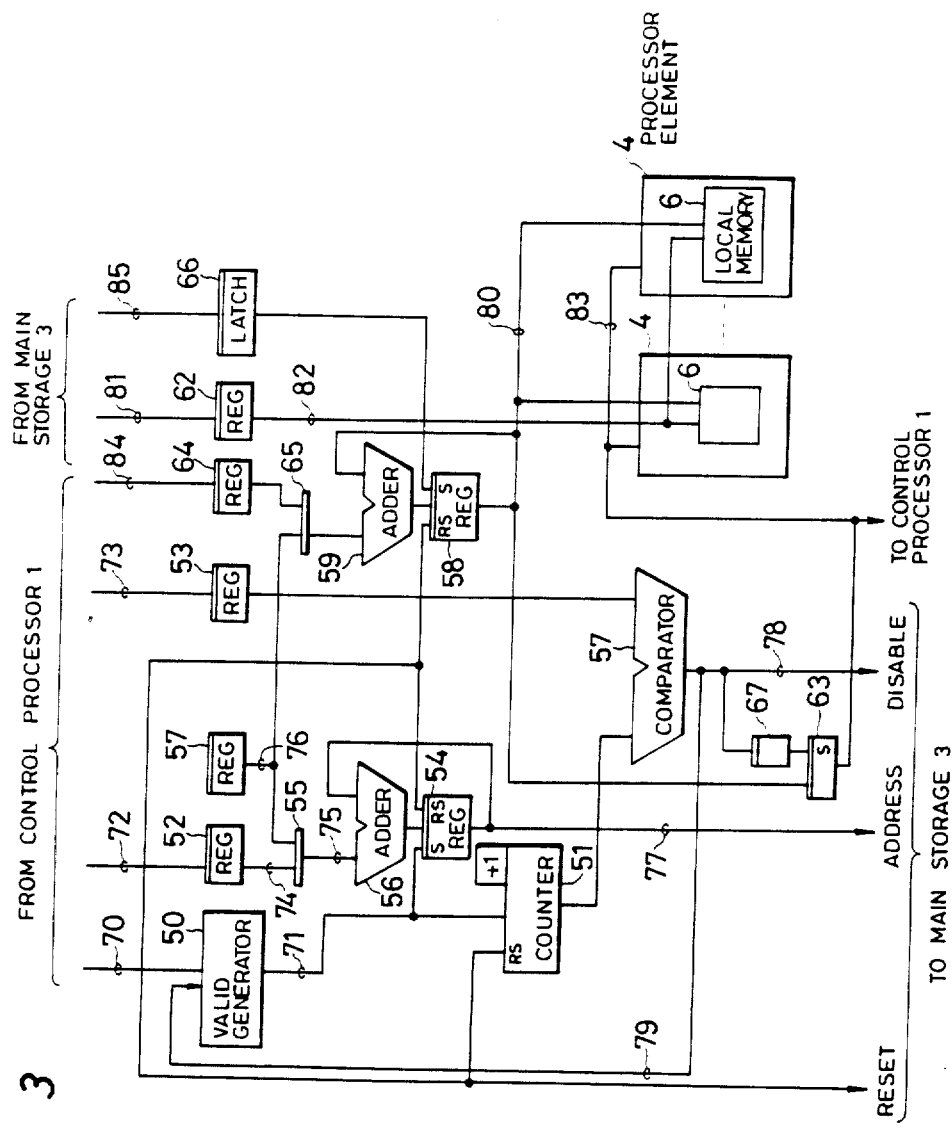
FIG. 3 is a block diagram showing a logic circuit related to the broadcasting operation of the processor array controller.

FIG. 3 is a block diagram of the processor array controller 2 which takes part in the broadcasting operation. As a broadcasting instruction is detected by a control processor 1 in FIG. 3, a start designation is sent via a path 70 to energize a valid generator 50 which sends a signal onto a path 71 in synchronism with a timing pulse after a machine cycle of the start designation. Here, the signal is referred to as a valid signal. The valid signal is counted up by a counter 51 which is reset by a start designation signal.

As soon as the start designation signal is sent onto the path 70, the start address of a subroutine to be stored in the local memory 6 is sent onto the path 72 and the program length is sent onto the path 73 from the control processor 1. These data are stored in the registers 52 and 53, respectively. A register 54 is reset at a moment when the start is designated. The data on the register 52 are input to an adder 56 via paths 74 and 75. A selector 55 connects paths 74 and 75 together during the initial stage, and then connects paths 76 and 75 together. The valid signal passes through the path 71 and serves as a set signal for the register 54. It is presumed here that a word length of an instruction constituting the subroutine is stored in the register 57. Therefore, in the register 54 is formed an address of a subroutine program region on the main storage in synchronism with the valid signal. The output of the register 54 is sent to the main storage 3 via a path 77.

A comparator circuit 57 compares the output of the counter 51 with a value of the register 53 which holds the program length. When the two values are in agreement with each other, a signal value "1" is sent onto a path 78. The signal on the path 78 passes through a path 79 to interrupt the operation of the valid generator 50. The signal on the path 78 is sent to the main storage 3 where it is used as a disable signal to interrupt the read out of the main storage at subsequent timings. The interrupted condition is maintained until a reset signal is sent to the main storage 3 via the path 70.

As the start designation is received via the path 70, a register 58 is reset, too. A start address on a local memory that sotres the subroutine program is sent from the control processor 1 via a path 84. This address is stored in a register 64 and is sent to an adder 59 via a selector 65 which connects the register 64 and the adder 59 together at the time of start but then connects the register 57 and the adder 59 together at the next timing.

A program read through the path 81 is sent from the main storage 3, and a signal is sent onto the path 85 to indicate that the program consists of effective data. A signal on the path 85 is once latched by a register 66 and is used to set the register 58. Then, every time when the program is sent from the main storage 3, an address is formed to store the program in the local memories and is set to the register 58.

The address on the register 58 is sent via the path 80 to each of the processor elements 4. On the other hand, the program read out from the main storage 3 passes through the path 81, stored in the register 62, and is sent to each of the local memories 6 via path 82.

The address on the register 58 is set to the register 63 when the comparator circuit 57 has detected the end of transfer of the subroutine program. A register 67 is provided to correct the delay of timing for reading the main storage. The address set to the register 63 designates a start address of the data area of the local memory 6. The start address is sent onto all of the processor elements via a path 83. The start address is further sent to the control processor 1 which utilizes the data when a plurality of subroutines are to be sent onto the local memories.

Reverting to FIG. 2(b), the processing subsequent to the statement (4) will now be described. The statement (4) describes in a simplified form an aggregate of statements that execute the processing to prepare on the main storage an argument table which stores the name of a subroutine that is to be executed by the processor elements and which further stores address of an argument of the subroutine on the main storage. The process for preparing the argument table is carried out by the control processor 1 shown in FIG. 1. Here, it is presumed that the argument list is generated, and a start address of the argument list and the list length are found on a given address on the main storage. FIG. 4 shows the form of an argument list.

After the statement (4) has been completed, the start address of the argument list is stored in the register GR0 by a statement (5), and a list length is stored in the register GR1 by a statement (6). A pattern of a subroutine processing is stored in the register GR2 by a statement (7). In the following case, i.e.,

```
C    PARALLEL DO
     DO 100 I = 1, N
     CALL SUB 1 (X (I))
     CALL SUB 2 (X (I))
```

-continued

100 CONTINUE of the parallel start DO block, it is not allowed to process the subroutines SUB 1 (×(1)) and SUB 2 (×(1)) in parallel. The subroutines SUB 2 (×(2)) and SUB 1 (×(3)), however, can be processed in parallel. This distinction is made relying upon the concept of a pattern. That is, the parallel start is impossible when the patterns are the same but is possible when the patterns are not the same.

Figure 5:
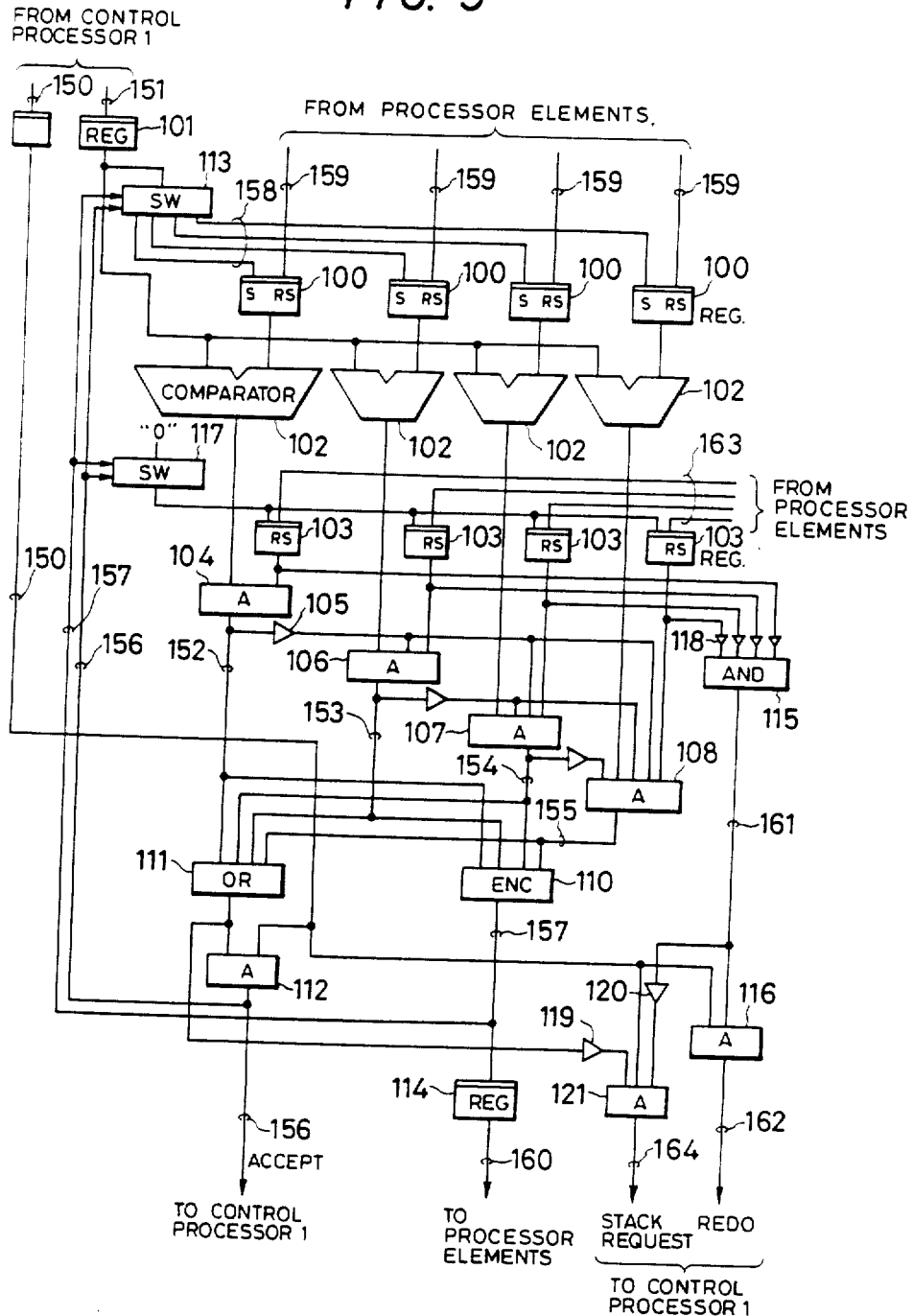
FIG. 5 is a block diagram showing a circuit for controlling the conditions of processor elements in the processor array controller.

Next, the start processing is effected by a statement (8) for the subroutine designated by the start of an argument list of FIG. 4. FIG. 5 is a block diagram of a logic in which the processor array controller 2 participates in the start processing.

In FIG. 5, reference numeral 100 denotes a register that stores the pattern of a task which is being processed by the processor elements. To simplify the drawing, the number of processor elements is four in FIG. 5. When a subroutine start request is issued from the control processor 1, a signal that indicates whether the request is significant or not is sent via a path 150. Further, a pattern of the start request is sent via a path 151. The pattern of a subroutine start request sent onto the path 151 is stored in the register 101, and is then compared by comparator circuits 102 with the data on the registers 100. It is regarded that they are in agreement with each other when the comparator circuit produces an output "0" and that they are not in agreement when the comparator circuit produces an output "1". Registers 103 control busy conditions of the processor elements, and are provided to correspond to the processor elements. That is, the condition is busy when the value is "0", and the processor elements are waiting for the processing (hereinafter referred to as idle) when the value is "1".

The output of the comparator circuit 102 and the value of the register 103 are subjected to the AND operation in an AND circuit 104. When the AND circuit 104 produces an output "1", a processor element which corresponds to this circuit indicates that the processing of a desired subroutine can be executed.

A signal value on a path 152 is inverted by an inverter 105, and is input to AND circuits 106, 107 and 108. When the AND circuits 106 to 108 produce outputs "1", the corresponding processor elements indicate that the processings of subroutines can be effected.

Outputs of the AND circuits 104, 106 to 108 are sent through paths 152 to 155 and are encoded through an encoder 110. When any one signal on the paths 152 to 155 assumes a value "1", the signals on other paths necessarily assume a value "0". These signals are subjected to the OR operation through an OR circuit 111, and are then subjected to the AND operation through an AND circuit 112 together with a signal on the path 150, and the result is sent onto the path 156. The signal on the path 156 serves as an accept signal that indicates that the start request for the control processor 1 is accepted by the processor array controller. On the other hand, a signal encoded through the encoder 110 passes through a path 157 and acts upon a switching circuit 113 which uses an accept signal on the path 156 as an enable signal. Therefore, when a subroutine start request is received by the processor array controller 2, a "pattern" data of the start request is set to a corresponding register 100 via the path 158. Similarly, the switching circuit 117 uses a signal on the path 157 and a signal on the path 156 as an enable signal and as a select signal, and sets a processor busy data to the register 103. The registers 100 are reset when the processes allocated to the processor elements are completed and when this fact is reported via the path 159. Further, the registers 103 are reset by a reset signal on the path 163 at the time when the processings allocated to the processor elements are completed. The reset signal sets "1". A code signal on the path 157 is once latched by the register 114 and is then sent to each of the processor elements via path 160.

Outputs of the registers 103 are inverted by inverters 118 and are subjected to the AND operation through an AND circuit 115. The output signal of the AND circuit 115, i.e., the signal on the path 161 is subjected to the AND operation by an AND circuit 116 together with a signal on the path 150, and is sent onto the path 162. When a redo signal on the path 162 has a value "1", it means that the subroutine start request is not accepted by the processor array controller 2. The signal on the path 162 is sent onto the control processor 1.

The signal on the path 161 is input to an AND circuit 121 via an inverter 120. The output of an OR circuit 111 is input to the AND circuit 121 via an inverter 119. The output of the AND circuit 121 is sent to a start instruction stack control circuit (FIG. 6) in the control processor 1 via a path 164. When a signal on the path 164 is "1", the processor elements are not all busy; i.e., though the subroutine can be started, it is impossible to execute it since the patterns of processing are in agreement. In this case, if it is simply determined that the subroutine cannot be started and if the same start request is sent from the control processor 1 to the processor array controller 2, the processor elements have to wait until the processing of the same pattern is completed by the processor elements. Therefore, limitation is imposed on the parallel processing even for the patterns have different probabilities of parallel processing due to serial nature of the start processing. To soften the limitation conditions, the control processor 1 is provided with a starting stack, designation for starting the subroutine of the control processor 1 is held in the stack so that the next subroutine can be started when the processor elements are not all busy and when the subroutine cannot be started due to the same pattern. The logic for this control operation is shown in FIG. 6.

Figure 6:
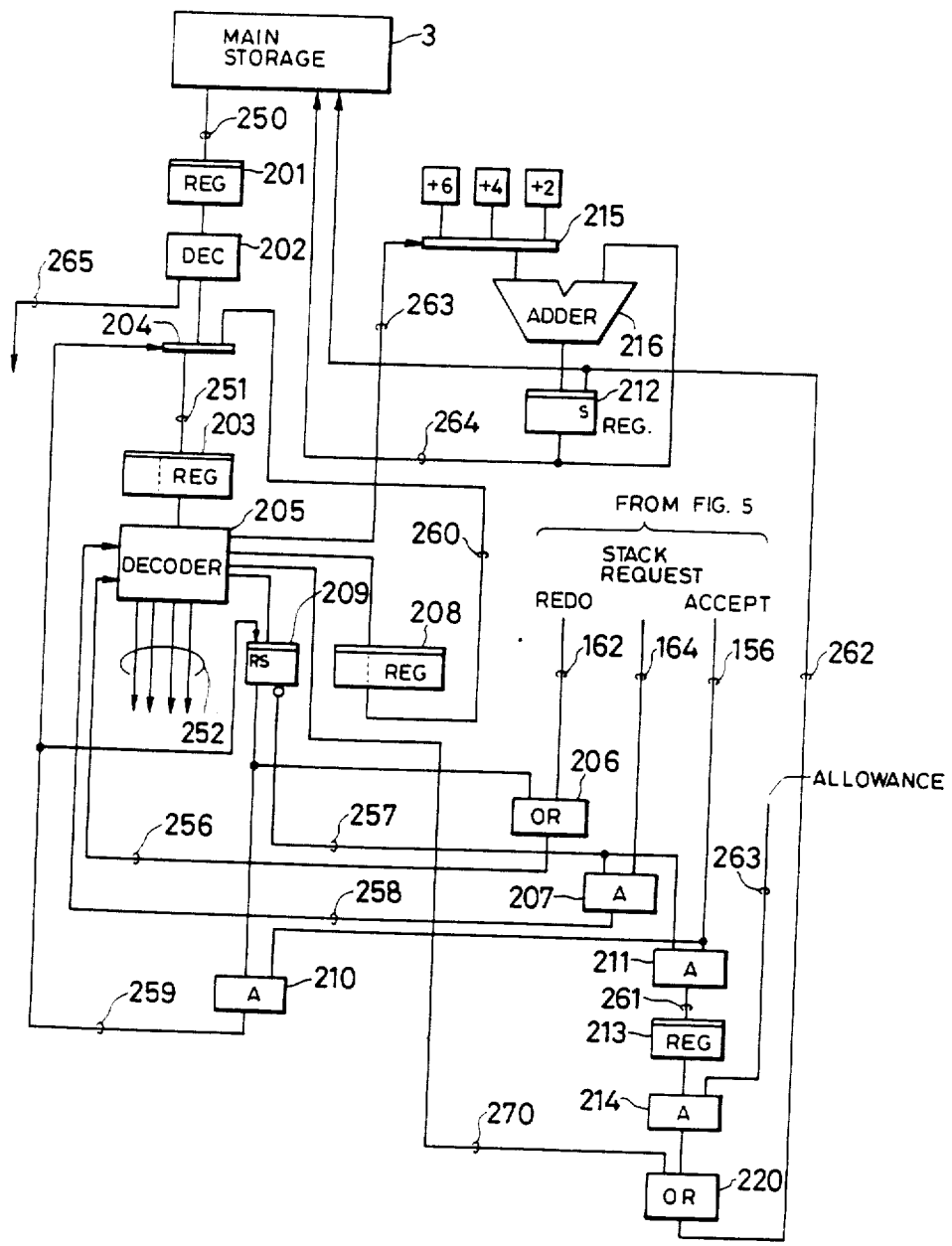
FIG. 6 is a block diagram which illustrates an instruction control portion of a parallel processing relationship in the control processor.

In FIG. 6, reference numeral 3 denotes a main storage which stores the program. The program read out by the control processor 1 of FIG. 1 is stored in a register 201 passing through a path 250 shown in FIG. 6. The data on the register 201 form an instruction which constitutes the program. The instruction is decoded by a decoder 202. When the instruction is a start instruction (CALL instruction of FIG. 2(b)) that is to be processed in parallel or a broadcasting instruction for transferring the data between the local memories and the main storage, the instruction is set to the register 203 through a path 251. During the initial condition, the selector 204 connects the decoder 202 to the path 251.

The start instruction and broadcasting instruction on the register 203 are decoded by a decoder 205, and the patterns formed by these instructions, start addresses, lengths and start designation signals are sent onto a path 252. The data on the path 252 are sent to the processor array controller 2 (FIGS. 3 and 5).

When the data sent from the decoder 205 onto the path 252 are processed by the processor array controller 2, an accept signal is sent onto a path 156. Conversely, when the data are not processed by the processor array controller 2, a request (hereinafter referred to as "redo") is sent onto a path 162 so that the instruction on the register 203 is decoded again and the data are sent onto the path 252. The redo is produced when the processor elements are all busy. There further may take place the case where the start instruction is not issued onto the processor elements even though the processor elements are not all busy since the processing that pertains to the same pattern is being executed. In this case, a stack request is sent onto the path 164.

When the redo is issued, the data acts upon the decoder 205 passing through an OR circuit 206 and a path 256. When the signal on the path 256 is "1", the decoder 205 decodes again the instruction on the register 203.

When the stack request is issued, an AND circuit 207 performs an AND operation of the signal on a path 257. The result which is sent onto a path 258 acts upon the decoder 205 and causes the instruction on the register 203 to be transferred to a register 208. At this moment, a register 209 is set to "1". When the value of the register 209 is "1", a signal on the path 257 is "0". Therefore, even if the stack request is issued, the AND circuit 207 does not carry out the AND operation, the signal on the path 258 assumes the value "0", and the instruction on the register 203 is not transferred to the register 205. This logic prevents the rear-end collision of an instruction on the instruction stack.

When the accept is issued onto the path 156, an AND circuit 210 examines whether there exists an instruction in the register 208 or not. When the instruction exists, a signal "1" is sent onto a path 259. This signal acts upon a selector 204 to couple a path 260 and the path 251 together. Therefore, the instruction on the register 208 is transferred to the register 203 at the next timing. The register 209 is reset at this moment. The start instruction is inverted owing to this operation.

On the other hand, even in case the accept is issued onto the path 156, the signal "1" is not sent from the AND circuit 211 onto the path 261 when the register 209 has the value "1". This prevents the accept from being propagated onto the path 262 and inhibits the register 212 from being set. That is, a next instruction fetch request is not issued to the main storage.

When the register 209 has the value "0", i.e., when no instruction exists on the register 208, the signal on the path 257 assumes a value "1" and a signal on the path 261 assumes a value "1". This signal passes through a register 213 for delay and is subjected to the AND operation by an AND circuit 214 together with a permission signal on a path 263, whereby a signal "1" is sent onto a path 262 via an OR circuit 220.

The decoder 205 detects the word length of an instruction on the register 203, and acts upon the selector 215 via path 263 so that a data for calculating a start address of the next instruction is sent to an adder 216. The adder 216 calculates the address of the next instruction based upon the address of the previous instruction on the register 212, and sends it to the register 212. The address on the register 212 is sent to the main storage 3 via a path 264.

On the other hand, when an instruction that has no relation to the processor array control is detected by the decoder 202, an instruction data is sent onto a path 265. The data is processed by another logic circuit of the control processor 1. This processing has no relation to the parallel processing of the present invention, and is not mentioned here.

Figure 7:
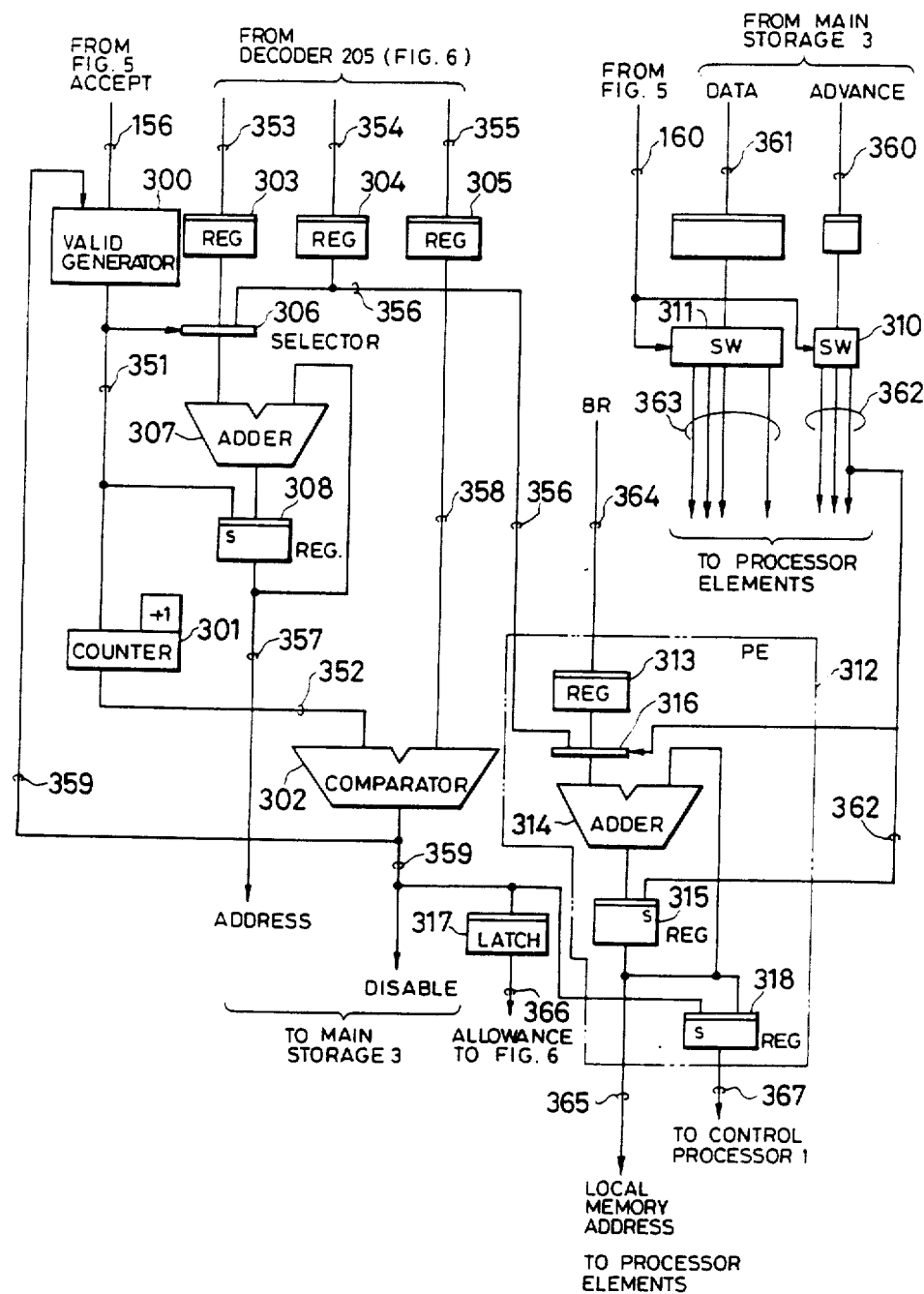
FIG. 7 is a block diagram showing an argument list read-out processing portion in the processor array controller.

FIG. 7 is a block diagram of a logic circuit for processing the transfer of an argument address list when the processor elements are to be started. In FIG. 7, as the logic circuit is energized via a path 156, a valid generator 300 opepates. That is, a valid signal is sent onto a path 351 in synchronism with a timing pulse after one machine cycle of the start designation.

The valid signal is counted by a counter 301. The counted result is sent to a comparator circuit 302 via a path 352.

A start address of the argument address list on the main storage, an increment of the address list and the element number of the list are input through paths 353, 354 and 355. The source that send these signals is the decoder 205 of FIG. 6. The start address, increment and element number are stored in the registers 303, 304 and 305, respectively. The timing for storing these data is the same as that of starting the valid generator 300.

At the next timing, the start address of the argument address list is sent from the register 303 to an adder 307 via a selector 306. This data is set to a register 308. The selector 306, first, connects the register 303 and the adder 307 together. When the valid signal is sent onto the path 351, however, the selector 306 connects the path 356 and the adder 307 together. Therefore, the address of each of the elements of the argument address list on the main storage is stored in the register 308 every time when the valid signal is produced. The address is sent to the main storage 3 via a path 357.

The element number of the argument address list on the register 305 is sent to a comparator circuit 302 via a path 358 and is compared with a count-up value of valid signals. When the comparator circuit 302 has detected that they are in agreement, a signal "1" is sent onto a path 359. This signal acts upon the valid generator 300 to interrupt the formation of valid signals. A signal on a path 359 is further sent to the main storage where it is discriminated to be a disable signal that indicates that the address data sent from the logic circuit of FIG. 7 onto the path 357 is not valid.

In response to an address train of the argument address list formed as mentioned above, the main storage sends advance signals of data that are read out as well as data via paths 360 and 361, respectively.

On the other hand, a signal which designates which processor elements be started determined by the encoder 110 of FIG. 5, acts upon switching circuits 310 and via a path 160. Owing to these switching circuits, the advance signals and the data that are read out, are sent to the processor elements via paths 362 and 363.

The data are written onto the local memories in the processor elements in a manner as described below. The logic in a dotted line 312 of FIG. 7 exists in accordance with each processor element.

Via a path 364 is sent a start address of a local memory so that an address table of the argument list can be written onto the local memories in the processor elements. As for the start address, the address data on the path 83 may be read out from the control processor, stored in the main storage, and may then be sent onto the path 364. That is, the address data may be obtained using a microprogram on the side of the control processor which executes the CALL instruction. When the control operation is so complex that it cannot be realized, then a specific address of the local memory may be determined to be a place where the argument address table is to be stored, and this address (constant) may be set to the register 313. There exists only one argument address table for the processor elements that are called by the control processor.

The start address of the argument address table on the local storage determined on the register 313 is then sent to an adder 314 and is stored in a register 315 which, first, stores "0". In the initial stage, the selector 316 connects the register 313 and the adder 314 together. When an advance signal is sent onto the path 362, however, the selector 316 connects the path 356 and the adder 314 together. Therefore, the adder 314 forms an address train of each of the elements of the argument address table on the register 315. The address train is sent to the local memories via a path 365.

Thus, when the address table of the argument list is read out from the main storage and when the completion of reading is detected by the comparator circuit 302, a signal which represents the completion is sent onto a path 359. This signal is sent onto a path 366 via a latch 317 for delay. This signal is logically equivalent to a signal on the path 263 of FIG. 6.

When a completion signal is sent onto the path 359, the value on the register 315 is transferred to a register 318. The value on the register 318 can be read out from the control processor via a path 367. The value on the register 318 is used to know the start address of the data area on the local memory.

The parallel start DO statement requires a final operation for waiting the completion of processing of the started processor elements. Owing to the processing for waiting the completion of the processor elements, the broadcasting processing is started for processing the parallel start DO that is subsequently produced during the stage where the processing of the parallel start DO that is produced first has not yet been completed, whereby a program portion is prevented from being destroyed in the local memories.

To execute the processing for waiting the completion of processor elements, a Test AP instruction is introduced as represented by the statement (11) in FIG. 2(b). This instruction makes it possible to examine busy data of a register that stores the conditions of processor elements in the processor array controller.

Figure 8:
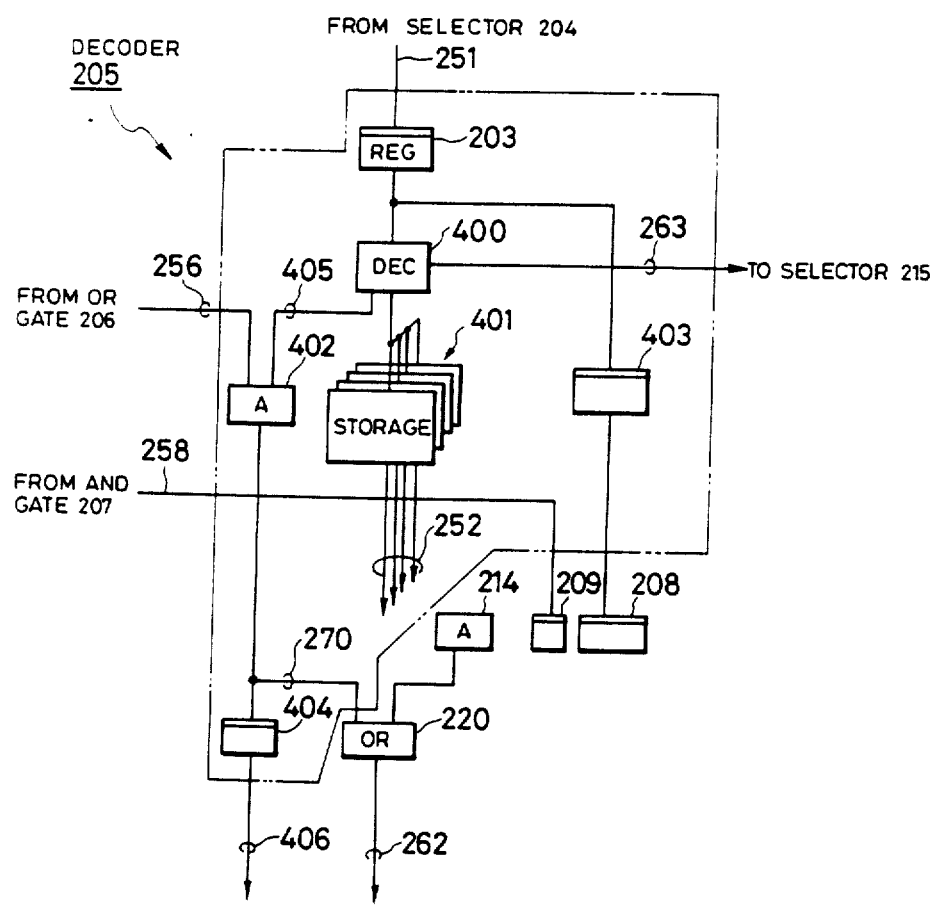
FIG. 8 is a block diagram which illustrates in detail a decoder in the instruction control unit of FIG. 6.

As the Test AP instruction is started in FIG. 5, a start signal is sent from the control processor via the path 150. Conditions of the processor elements are held in the register 103. When the value of the register 103 is "0", the corresponding processor element is under busy condition. The output signal of the register 103 is inverted by the inverter 118, subjected to the AND operation by the AND circuit 115, and is sent onto the path 161. When a signal value on the path 161 is "1", the processor elements are all busy. That is, the processing of parallel start DO is not completed. The signal on the path 161 is subjected to the AND operation by the AND circuit 116 together with a signal on the path 150. The output signal path 162 is the same as the path 162 of FIG. 6. The signal is transmitted to the decoder 205 via path 256. FIG. 8 is a block diagram of the decoder 205 of FIG. 6. The logic of FIG. 8 partly overlaps that of FIG. 6. The overlapped portions are denoted by the same reference numerals.

In FIG. 8, as the instruction is stored in the register 203, a decoder 400 decodes the instruction and sends onto the path 263 a signal that represents the word length of the instruction. To obtain a variety of order data necessary for executing the instruction, furthermore, a storage means 401 is read out and the outputs are sent onto the path 252. A redo signal and a stack signal are sent onto the paths 256 and 258 from the processor array controller 2 in response to the outputs formed on these paths 252 and 263.

Upon receipt of the Test AP instruction, the decoder 400 sends a signal "1" onto a path 405. This signal is subjected together with a redo signal to the AND operation by an AND circuit 402, and the result is produced onto the path 270. That is, when the Test AP instruction is executed and when the processor elements at this moment are all busy, the signal assumes the value "1". The signal on the path 270 is subjected together with the value on the register 214 to the OR operation by the OR circuit 220, and the result is sent onto the path 262. The signal that assumes the value "1" indicates that the instruction is completed. On the other hand, the signal on the path 270 is sent via register 404 to a logic circuit that forms the condition code for the control processor.

When the signal on the path 258 assumes the value "1", the instruction on the register 203 is transferred to the register 208. A register 403 stores the instruction for a period of time in which the instruction is executed by the processor array controller.

According to the system of the present invention, the parallel processing can be described by adding a special comment statement for describing the parallel processing to the existing serial process language such as FORTRAN language, and by utilizing the probability for parallel process description in the serial process language. That is, by using the parallel processor system of the present invention, the programming can be effected to execute parallel processing (1) liberating the program from giving attention to the number of processor elements, and (2) maintaining a memory structure of a logically single hierarchy.

The thus programmed source codes are designated by a compiler to effect the parallel processing, the CALL statement in the DO is converted into a processor element start instruction, and the instruction is produced to broadcast the object coees to be executed in the processor elements onto local memories of the processor elements, thereby constituting a parallel processing environment.

In accordance with the aforementioned logic system and being assisted by the compiler, the parallel processor system is provided with:
1. a circuit for controlling the conditions of the processor elements;
2. a logic circuit for controlling the "pattern" of processings executed in the processor elements;
3. a logic circuit which allocates the processor elements that are under the condition of executing the procedure processing, using outputs of the logic circuits of the above items 1 and 2;
4. a logic circuit which temporarily stacks a procedure process start request that is not permitted to be started in parallel due to the agreement of the "pattern" despite the processor elements are not all busy, and which then executes, in advance, the subsequent start request whose "pattern" is not in agreement;
5. a logic circuit which stores the procedure, before it is started, from the main storage into the regions that are continuous from the designation address in the local memories of all processor elements; and
6. a logic circuit which reads the argument list data that accompanies the procedure from the main storage at the time when the procedure is to be started, and which stores it in the processor elements that are to be started.

Therefore, when it is designated to start the procedures in parallel, the hardware of the parallel processor system examines the conditions of the processor elements and further examines whether there exists the same "pattern" of processes in the processors of under busy condition. When it is allowed to start the procedures in parallel, the procedures can be started. This makes it possible to start the tasks at high speeds that was not possible with the conventional multi-tasking process.

In the conventional parallel processor system provided with a main storage and a plurality of storage hierarchies such as local memories, the program had to take into consideration the plurality of storage hierarchies. In the parallel processor system of the present invention, the processes are started in parallel by starting the procedure that is designated by the program statement, and it is discriminated whether the variable exists in the main storage or in the local memories depending upon whether the name of variable is included in the argument list of procedure or not and, then, the access instruction that corresponds thereto is formed by the compiler. These software processes are carried out, and the hardware of the parallel processor system realizes the function for sending the argument list on the main storage onto the local memories of the processor elements that are started at the time of starting the procedures in parallel. By using the argument list written onto the local memory, therefore, the address for referring to the main storage can be calculated from the processor elements. Therefore, even in a system consisting of the main storage and a plurality of hierarchies of local memories, the user is allowed to carry out the programming without taking the memory hierarchies into consideration.

According to the present invention which is constructed to effect parallel start depending upon the conditions of the processor elements, the task processing can be carried out at high speeds without much modifying the existing software.

What is claimed is:
1. A parallel processing system having a plurality of processor elements comprising:
   a main storage;
   a processor array control means connected to said main storage for controlling execution of a processing;
   a control processor which is connected to said main storage and to said processor array control means for reading an instruction from said main storage, and for requesting said processor array control means to execute a processing in accordance with a procedure start instruction; and
   a plurality of processor elements each including a local memory and wherein each processor element is connected to said processor array control means;
   wherein said processor array control means comprises
   means for responding to a request from said control processor to transfer a program from said main storage to each of the local memories of said plurality of processor elements,
   a plurality of first registers corresponding to said processor elements for holding patterns of tasks, said first registers being reset when corresponding processor elements turn into an idle state, each pattern being relevant to an argument address of a memory area of the main memory used by a task to be performed, a plurality of comparators corresponding to the first registers for comparing patterns held by the corresponding first registers with a pattern designated by the control processor, wherein when a pattern held by a first register is coincident with said pattern designated by said control processor, the coincident state indicates that an argument address corresponding to the pattern designated by the control processor is being used by a processor element corresponding to said register, a plurality of second registers corresponding to said processor elements for holding states of said processor elements representing whether the processor elements are busy or not, said second registers being reset when corresponding processor elements turn into an idle state, means for selecting a processor element that is to be activated based upon a result of said comparison performed by said plurality of comparators and the content of the second registers, and means for storing said pattern designated by said control processor in a first register corresponding to said selected processor and setting to a busy state a second register corresponding to the selected processor.

2. A parallel processing system according to claim 1 further comprising:

means for holding a task when at least one of said plurality of comparators detects a coincident; and means for selecting said task being held as a next task to be performed.

* * * * *